United States Patent [19]

Wiegand et al.

[11] Patent Number: 4,987,742

[45] Date of Patent: Jan. 29, 1991

[54] PROCESS FOR THE GENERATION OF MECHANICAL ENERGY IN THE AMMONIA OXIDATION STEP OF A NITRIC ACID PRODUCTION PROCESS

[75] Inventors: Karl W. Wiegand; Michael Thiemann; Erich Scheibler, all of Dortmund, Fed. Rep. of Germany

[73] Assignee: Uhde GmbH, Dortmund, Fed. Rep. of Germany

[21] Appl. No.: 472,732

[22] Filed: Jan. 31, 1990

[30] Foreign Application Priority Data

Feb. 7, 1989 [DE] Fed. Rep. of Germany ....... 3903571

[51] Int. Cl.$^5$ ............................................. F01K 25/10
[52] U.S. Cl. ...................................... 60/648; 60/651; 60/671
[58] Field of Search .................... 60/651, 671, 648

[56] References Cited

U.S. PATENT DOCUMENTS

| 1,014,418 | 1/1912 | Shuman | 60/648 |
| 1,864,448 | 6/1932 | Lorenzen | 60/648 X |
| 4,126,000 | 11/1978 | Funk | 60/648 |

Primary Examiner—Allen M. Ostrager
Attorney, Agent, or Firm—Toren, McGeady & Associates

[57] ABSTRACT

A process is disclosed whereby the recovery of process heat contained in NOx gases which have been generated by the combustion of ammonia in the ammonia oxidation step of a nitric acid production process is improved and whereby the recovery of the process heat takes place at a low temperature range. The process involves using process heat contained in NOx gases to evaporate and superheat liquid ammonia which is circulated in a separate loop, then expanding the superheated ammonia in a turbine to generate mechanical energy and subsequently pressurizing, reevaporating and re-superheating the ammonia.

12 Claims, 1 Drawing Sheet

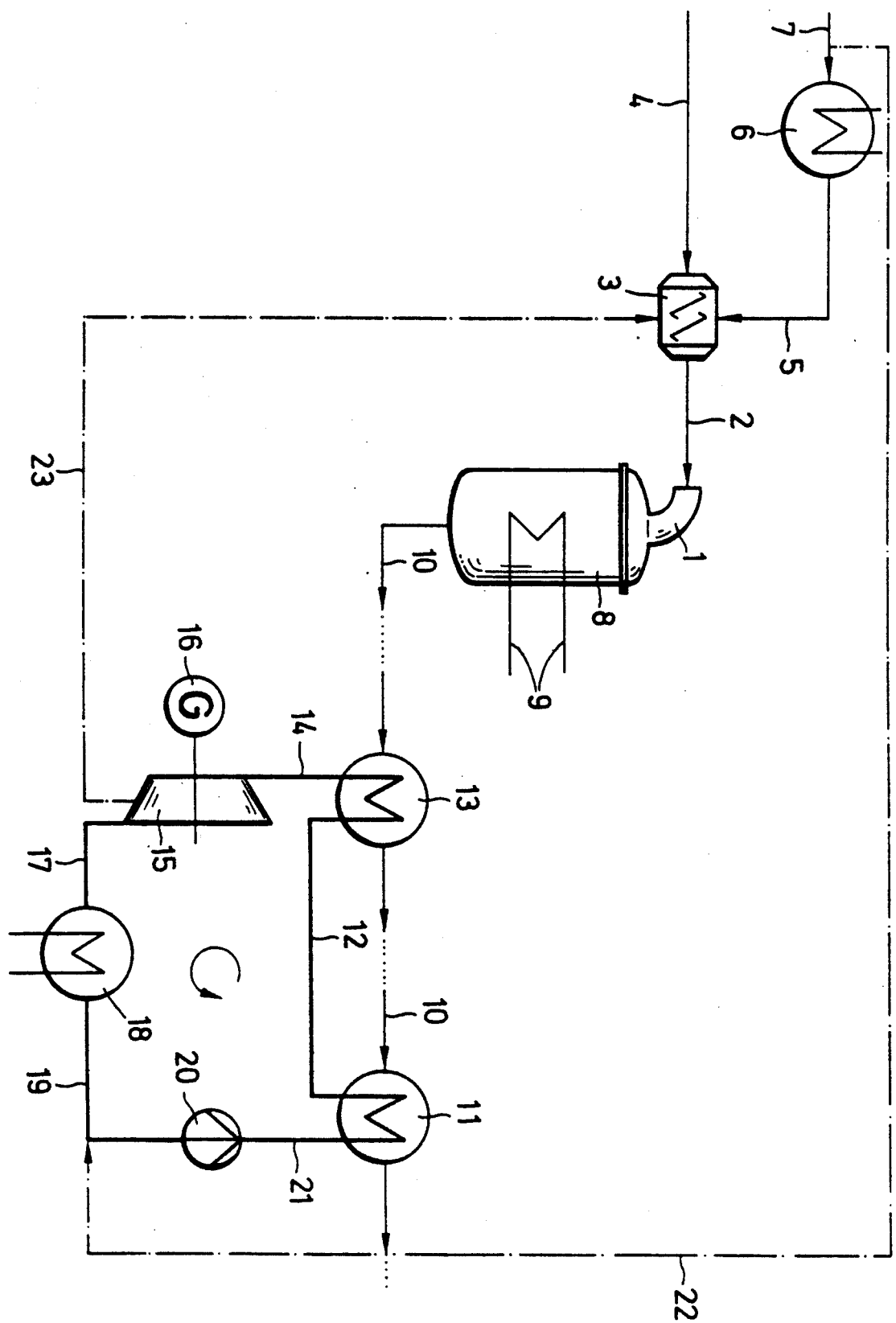

PROCESS FOR THE GENERATION OF MECHANICAL ENERGY IN THE AMMONIA OXIDATION STEP OF A NITRIC ACID PRODUCTION PROCESS

BACKGROUND OF THE INVENTION

This invention relates to a process for the generation of mechanical energy in the ammonia oxidation step of a process for the production of nitric acid, i.e. the step wherein ammonia is burned to form $NO_x$.

Processes for nitric acid production are known in which ammonia is oxidized to form $NO_x$ gases; the oxidation normally takes place at a temperature of 800° to 970° C. The downstream absorption of $NO_x$ gases in water to form $HNO_3$ is carried out at substantially lower temperatures in order to meet the reaction requirements. Therefore, the $NO_x$ gas stream must be cooled prior to entering the absorption unit.

According to the known processes, a multi-step cooling method is used. In the first step the $NO_x$ gases are cooled at a high temperature in order to utilize the process heat. Hence, a steam generator is connected directly to the burner and used for the generation of steam. Furthermore, the process heat in the $NO_x$ gases may also be use for tail gas heating, etc.

After cooling the $NO_x$ gases to approximately 200° C., however, the gases are further cooled with water without making use of their residual heat. Consequently, the known cooling processes employed in this case require large quantities of cooling eater causing higher operating costs, or larger heat exchangers must be installed which results in higher investment costs.

SUMMARY OF THE INVENTION

The object of the invention is the provision of a process for the production of nitric acid wherein the process heat is better utilized.

A particular object of the invention is the recovery, at relatively low temperature, of heat from the $NO_x$ gases produced during the ammonia oxidation in the production of nitric acid.

These and other objects are obtained by the invention, which involves a process as described above, but wherein liquid ammonia is evaporated and superheated in a separate loop with the aid of the process heat in the $NO_x$ gases and the superheated ammonia is expanded in a turbine and thus converted to mechanical energy. Thereafter, the ammonia is compressed, reevaporated and resuperheated.

Thus, according to the invention, mechanical energy is generated in the ammonia oxidation step of a nitric acid producing process, wherein ammonia is burned to form $NO_x$, by evaporating and superheating ammonia in separate loop with the aid of the process heat of the $NO_x$ gases, expanding the superheated ammonia in a turbine to generate mechanical energy and subsequently pressurizing and then reevaporating and reheating the ammonia.

BRIEF DESCRIPTION OF THE DRAWINGS

The FIGURE is a flow diagram of an oxidation unit of a nitric acid plant which illustrates an embodiment of the invention.

DESCRIPTION OF THE INVENTION

By means of the process of the invention, the recovery of process heat available during nitric acid production is substantially improved because the process heat of the $NO_x$ gases can be utilized at a lower temperature range. This technology is implemented with the aid of ammonia, which is used as the heat transfer fluid in a closed loop since it can be evaporated and superheated at a relatively low temperature at a given pressure. If water were used, as in the case of conventional thermomechanical processes, higher temperatures would be required. Further, in the method of the invention the energy is directly available for the process, for example, by coupling the back-pressure turbine to other machines, such a generators, etc.

In a particularly preferred embodiment of the invention, isobaric evaporation and superheating of liquid ammonia is carried out at a pressure of 20 to 100 bars, even more preferably at about 80 bars, which considerably improves the energy balance of the process.

Depending on the pressure selected, the ammonia is superheated to a temperature of 130° to 300° C., preferably to 140° to 180° C. Superheating can be carried out with the aid of the residual heat in the $NO_x$ process gas even at a relatively low temperature, so that the process heat of this gas can be fully utilized.

With reference to the figure, which shows the configuration of the oxidation unit of a nitric acid plant and illustrates an embodiment of the invention, the burner 1 is fed with a mixture of ammonia and air withdrawn from mixer 3 and piped through line 2. Mixer 3 communicates via line 4 with an air source (not shown) and via line 5 with ammonia evaporator 6, which is fed continuously with liquid ammonia withdrawn from an ammonia storage facility (not shown) and piped through line 7 to the evaporator 6.

Heat exchanger 8, preferably an evaporator, is connected to burner 1 in order to use the hot $NO_x$ gases for heating and evaporating a fluid, preferably water, piped though line 9. The $NO_x$ gas outlet of evaporator 8 communicates with line 10, which is connected to further downstream heat exchangers and to the absorption tower (not shown).

The $NO_x$ gases piped through line 10 are required mainly for heating an enclosed ammonia process loop comprised of ammonia evaporator 11, which is connected via line 12 to ammonia super-heater 13. The ammonia superheated in vessel 13 flows through line 14 to turbine 15 which, for example, can be connected to generator 16. Turbine 15 communicates via line 17 with condenser 18, which is connected to pump 20 via line 19. The liquefied ammonia is pressurized by pump 20 and piped through line 21 to evaporator 11. Line 22, shown by dash-dots, which is a branch of line 7, is connected to the ammonia storage facility (not shown) and further to line 19 of the loop, so that ammonia can be fed to the loop via line 22. The ammonia is heated, evaporated and expanded in this loop and thereafter piped to mixer 3 via line 23, also shown by dash-dots; adequate shut-off devices are installed in line 23 to disconnect it from the loop and to obtain a closed ammonia loop.

An ammonia/air mixture is oxidized, in accordance with known processes in burner 1 to form $NO_x$ gases at 900° C., which are cooled in evaporator 8 to about 450° C. The $NO_x$ gases are withdrawn from evaporator 8 via line 10 and further cooled in downstream heat exchangers (not shown) prior to being fed to ammonia super-heater 13. The inlet temperature of the $NO_x$ gases will probably be about 200° to 250° C., which is sufficient to superheat the ammonia in the closed loop to 140° to 180° C. at 20 to 100 bars. Thereafter, the $NO_x$ gases are further cooled in evaporator 11, in which ammonia is circulated and evaporated at a substantially lower temperature compared to superheating. This method permits a profitable utilization of the process heat in the $NO_x$ gases in a relatively low temperature range.

In the ammonia loop, liquefied ammonia is evaporated in evaporator 11, subsequently superheated to 140° to 180° C. in superheater 13 and finally expanded in a turbine, thus generating mechanical energy available for generator 16 or other machinery. Thereafter, the ammonia condenses in condenser 18, is pressurized by means of pump 20 and reevaporated in evaporator 11.

It is of course possible to modify the embodiment of the invention illustrated in the drawing while maintaining the principles of the invention. Hence the invention is not limited to the illustrated embodiment. For example, the process heat in the $NO_x$ gases may be recovered in the superheater and evaporator at even higher temperature. Further, the ammonia circulated in the loop can be replaced by other fluid of similar vaporization properties.

We claim:

1. A process for the generator of mechanical energy in the ammonia oxidation step of a nitric acid production process, wherein ammonia is burned to form $NO_x$, comprising evaporating and superheating liquid ammonia by means of the process heat in the $NO_x$ gases in a separate loop, expanding the superheated ammonia in a turbine to generate mechanical energy and subsequently pressurizing, reevaporating and resuperheating the ammonia.

2. The process according to claim 1, in which the liquid ammonia is evaporated and superheated by isobaric means at a pressure of 20 to 100 bars.

3. The process according to claim 1, in which the liquid ammonia is evaporated and superheated by isobaric means at a pressure of about 80 bars.

4. The process according to claim 1, in which the ammonia is superheated to 130° to 300° C.

5. The process according to claim 1, in which the ammonia is superheated to 140° to 180° C.

6. The process according to claim 1, in which the liquid ammonia is evaporated and superheated to about 130° to 300° C. by isobaric means at a pressure of 20 to 100 bars.

7. In a process for the production of nitric acid, wherein ammonia is oxidized by combustion to form $NO_x$ gases, the generation of mechanical energy by the steps comprising using the process heat of the $NO_x$ gases to evaporate and superheat liquid ammonia in a separate loop, expanding the superheated ammonia in a turbine to generate mechanical energy, subsequently pressurizing the ammonia and then using the process heat of $NO_x$ gases to reevaporate and resuperheat the ammonia.

8. The process according to claim 7, in which the liquid ammonia is evaporated and superheated by isobaric means at a pressure of 20 to 100 bars.

9. The process according to claim 7, in which the liquid ammonia is evaporated and superheated by isobaric means at a pressure of about 80 bars.

10. The process according to claim 7, in which the ammonia is superheated to 130° to 300° C.

11. The process according to claim 7, in which the ammonia is superheated to 140° to 180° C.

12. The process according to claim 7, in which the liquid ammonia is evaporated and superheated to about 130° to 300° C. by isobaric means at a pressure of 20 to 100 bars.

* * * * *